March 25, 1941.　　　　　F. GRAY　　　　　2,236,172

ELECTRO-OPTICAL SYSTEM

Filed March 4, 1936

INVENTOR
F. GRAY
BY
*Ch. Sprague*
ATTORNEY

Patented Mar. 25, 1941

2,236,172

UNITED STATES PATENT OFFICE 2,236,172

ELECTRO-OPTICAL SYSTEM

Frank Gray, New York, N. Y., assignor to Bell Telephone Laboratories, Incorporated, New York, N. Y., a corporation of New York Application March 4, 1936, Serial No. 67,061

15 Claims. (Cl. 178—6)

This invention relates to electro-optical systems and more particularly to means for setting up electric currents representative of the various light-tone values of an object, as in television or picture transmission scanning.

An object of this invention is to provide means for generating television image currents by utilizing photoelectric materials which have the property that radiations of one wave-length range produce an electrical response and radiations of a different wave-length range modify this response in an unproportional manner.

A feature of this invention is to utilize both photo-emissive and photoconducting substances as the photoelectric materials used in the production of image curents, some embodiments of the invention being adapted to the use of photo-emissive material and some to the use of photo-conducting material. In each embodiment, however, the response of the system including the photoelectric material varies in a non-linear manner with respect to the intensity of the total radiations falling thereon.

According to one embodiment of the invention, the object or field of view is supplied with radiations of one wave-length range and radiations of this range reflected from the object are applied to a target comprising photo-emissive material to cause this material to emit electrons toward an electrode which is positively biased with respect to the target, and the target is scanned with a moving beam of radiations of a different wave-length range which does not cause emission and, further, which tends to successively stop the electronic emission from elemental areas of the photo-emissive material, whereby an image current, which varies in an inverse manner to the lights and shades of the object, flows through an external circuit including a resistance.

As an alternative, the target described above may have projected thereon an image of the object in radiations of a wave-length range which do not cause emission, but which tend to reduce in succesison the emission from elemental areas of the target caused by a beam of radiations of the second wave-length range. The image current flowing through the external circuit including the resistance is, as before inversely proportional to the lights and shades of the object.

In another embodiment, the target may comprise a photoconducting material possessing the property that its response, i. e., its change in conductivity, is linear with respect to the intensity of the radiations of one wave-length range projected upon it, but non-linear with respect to the total intensity of radiations incident upon said target when said target has applied thereto, in addition to the radiations of said first-mentioned wave-length range, a group of radiations of a second wave-length range. Radiations in one wave-length range may be reflected from the object upon the target while a beam of radiations in the second wave-length range may be used to scan successively the elemental areas of the target. The non-linear response may be produced in a manner such that the second group of radiations adds to the response of the first group, but in an unproportionate manner, or it may be produced in a manner such that the second group of radiations can be said to produce a response which subtracts from the response of the first group.

The invention will be more readily understood by referring to the following description, taken in connection with the accompanying drawing forming a part thereof, in which.

Figure 1:
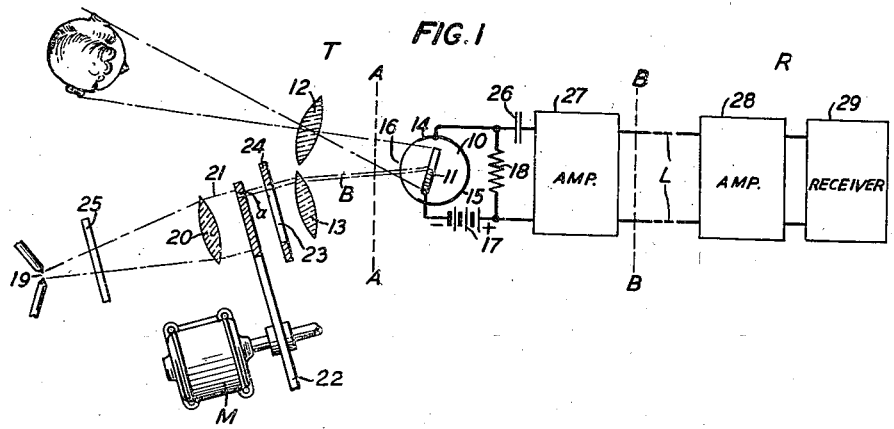
Fig. 1 is a diagrammatic representation of a television system including the invention.

Referring more particularly to the drawing, Fig. 1 shows a television system comprising in general a television transmitter T, suitable connecting media L, and a receiving station R.

The transmitting station comprises a photo-electric cell 10 of the photo-emissive type having a cathode 11, an optical system, represented generally as the lens 12, for reflecting an image of an object or field of view onto the cathode 11, and another optical system for directing a moving beam of radiations produced by a source of radiations and a moving disc containing a spiral of apertures $a$ onto the cathode 11 where it traverses successively the elemental areas of the cathode.

The photoelectric cell 10 comprises a gas-tight container 14 of glass or similar material enclosing a cathode 11 and an anode 15 which is preferably a metallic coating for the entire inside of the container 14 except for a window space 16. The cathode 11 is preferably made of sodium or potassium which has been subjected to small amounts of bromide or iodine vapor during manufacture. This cathode has the property of emitting electrons towards the anode when subjected to light of a limited wave-length range, such as blue light, but this electron emission is decreased and, in some cases, completely stopped when it is, in addition, irradiated with red or infra-red light. For a more complete description of and a method of manufacturing cathodes of the type described above, reference may be made to U. S. Patent 1,948,941, February 27, 1934, to A. R. Olpin.

A battery 17 and a resistance 18 are connected between the anode 15 and the cathode 11 to bias the anode to a positive potential with respect to the cathode so that electrons are emitted towards the anode when the light falls on the cathode.

An optical system, represented generally by a lens 12, gathers radiations supplied by a source, not shown, and reflected by the object or field of view, and projects them through the window 16 of the photoelectric cell 10 onto the cathode 11, all of the elemental areas of which are thereby activated in accordance with the tone values of the corresponding elemental areas of the field O. Any suitable source of light may be used to produce the radiations reflected from the object O. Blue light, that is, light having a wave-length of from about 4500 to 4700 Angstrom units, has been found to be satisfactory for this type of radiation.

Also associated with the photocell 10 is a second optical system comprising a source of radiations 19 and a lens system, represented generally by a lens 20, for gathering radiations from the source 19 and supplying them in the form of a beam 21 of parallel rays to a small area of a disc 22 in alignment with the cathode 11. The disc has a series of apertures $a$ arranged near its periphery in the form of a spiral through which, one at a time, a portion of the beam from the source 19 passes in the form of a thin beam which beam is caused to pass through an opening 23 in an opaque mask or shutter 24 and a lens system illustrated generally as lens 13. These elements cooperate to cause a thin beam B of radiations to sweep across the cathode 11 of the photoelectric cell 10. The opening 23 is of such shape and dimensions that light from only one aperture is permitted to emerge at a time. As the disc 22 is rotated by the motor M, each aperture controls the production of a thin beam of radiations which successively traverses parallel lines of the cathode 11. As it is desired that this beam of radiations be used to stop the emission of electrons from the elemental areas of the cathode 11 caused by the radiations reflected from the object O, the beam of radiations may be in the red or infra-red range, that is, light of a wave-length greater than about 6400 Angstrom units. To filter out all radiations except the red or infra-red, a suitable filter 25 is placed between the source 19 and the lens 20.

To better understand the operation of the system shown in Fig. 1, let it be assumed that an image of the object in blue light is formed on the cathode 11 by the lens 12. In the absence of the scanning beam, the total current from the whole image is $I_0$. Let $i$ be the fraction of current that was contributed by a particular elemental area at any instant (before the scanning spot covers it). Then the actual current at that instant is:

$$I = I_0 - i \quad (1)$$

because the red or infra-red beam destroys or substantially reduces the small elemental current $i$. As the scanning beam B moves successively over the elemental areas of the cathode 11, $i$ will vary with the tone values of the object. Thus, a current equal to $(I_0-i)$ will flow through the external circuit including the battery 17 and the resistance 18. A condenser 26 in the external circuit blocks the passage of the constant portion of this current through the amplifier 27 so that only the variable image current will be transmitted to the amplifier. This is a negative or inverse picture current, but it can be reversed in any well-known manner to give a positive image current.

After being raised to the desired power level by the amplifier 27, which may comprise a multi-stage amplifier, the image current is transmitted over the line L to a remote station including a receiver R. For line carrier or radio transmission, the amplifier image current may be used to modulate the carrier current of the proper frequency for transmission.

The receiving station R may comprise an amplifier 28, the output circuit of which includes a television receiver 29. Any suitable receiver for the purpose may be used. A satisfactory receiver utilizing a glow discharge lamp and a scanning disc is disclosed in U. S. Patent 1,728,122, September 10, 1929, to Horton. A suitable cathode ray tube receiver is disclosed in application Serial No. 466,067 of J. B. Johnson, filed July 7, 1930. If it is desired to use the system shown in Fig. 1 for picture transmission, a suitable receiver is disclosed in U. S. Patent 1,606,227, November 9, 1926 to J. W. Horton et al.

While there has been described in connection with Fig. 1 a system using blue radiations to project an image of the object on the target or cathode 11 to thereby cause emission of electrons from the cathode to the anode 15, and a scanning beam in red or infra-red radiations to successively stop or substantially reduce the emission from elemental areas of the cathode, it will of course be obvious that the functions of these two groups of radiations may be reversed. For example, the cathode 11 may have reflected thereon an image of the object in radiations of a wave-length range which do not cause emission such, for example, as the red or infra-red range when the cathode 11 is constructed as described above, but which tend to reduce the emission from the elemental areas of the target when these areas are successively scanned by a scanning beam of radiations in a wave-length range which tends to cause this emission such as, for example, blue light. The emission to the anode controls the formation of a current which is proportional in an inverse manner to the light and shades of the objects. This can be better understood when it is considered that a point of maximum brightness on the object is reflected onto an elemental area of the cathode in a maximum of red or infra-red radiations which tends to substantially prevent any emission from that elemental area which would have been caused by the scanning beam when passing over it, and, conversely, a point of minimum brightness on the object reflects a minimum of infra-red rays onto the cathode, thus allowing the scanning beam to produce a maximum response from that elemental area. Unlike the preceding embodiment, however, this arrangement does not have a constant current component flowing through the external circuit which feature is, of course, advantageous. This advantage must be weighed with the possible disadvantage of projecting red or infra-red rays, because of their heating properties, upon the object (when the object is a human being or a motion picture film) in considering which of these two methods is best adaptable to the problem at hand.

Figure 2:
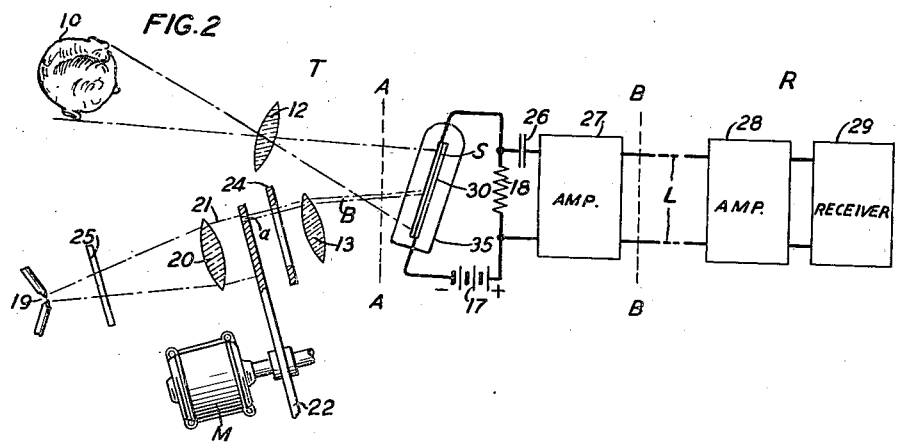
Fig. 2 shows a system similar to that of Fig. 1 except that a photoconducting material is used instead of the photo-emissive material utilized in Fig. 1.
Figure 3:
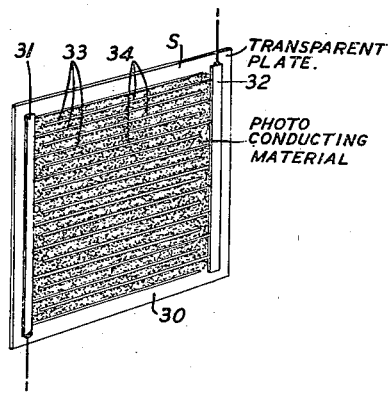
Fig. 3 is an enlarged view of the target used in the system of Fig. 2.

Fig. 2 shows a system which utilizes a photoconducting cell in place of the photo-emissive cell 10 of Fig. 1. For a clearer understanding of the system of Fig. 2, reference will now be made to Fig. 3 which shows an enlarged view of a target used in the photoconducting cell. This target S comprises an insulating plate 30 of glass or similar material on which are mounted metal strips 31 and 32 to which are respectively connected sets of interleaved fine metallic strips 33 and 34. The spaces between the fine metallic strips 33 and 34 are filled with a suitable photoconducting material such as mercury iodide. Mercury iodide has the property of increasing its conductivity in a proportional or linear manner when exposed to radiations of a single wave-length range, but when it is exposed simultaneously to two groups of radiations of different wave-length ranges, its response, i. e., its change in conductivity, is not proportional to the total intensity of radiations applied to it. The target S, which is preferably mounted in a gas-tight container 35, is included in the circuit which also includes a battery 17 and a resistance 18.

Associated with the photoconducting cell of Fig. 2 are optical systems for reflecting an image of the object or field of view O onto the film 30 in one wave-length range of radiations, as, for example, blue light, and for producing a moving beam of radiations in another wave-length range, as, for example, red light, to scan successively the elemental areas of the plate 30. These optical systems, which are located to the left of the line A—A, are similar to the optical systems shown to the left of the line A—A in Fig. 1, except that the filter 25 would be appropriate to the passage of red radiations instead of the infra-red radiations used in Fig. 1.

The operation of the electro-optical system shown in Fig 2 is as follows: An image of the object is formed in blue radiations on target S, which radiations cause the photoconducting material to change its conductivity in a manner proportional to the intensity of the radiations incident thereon. A substantially constant current would thus flow through the circuit including the resistance 18 were it not for the action of the scanning beam B. This beam, which is formed in red radiations, scans the elemental areas of the target to successively change the conductivity of these areas, thus varying the flow of current to the circuit including the resistance 18. Due to the fact that the total response from mercury iodide is not proportional to the total intensity of the radiations applied to the target S, the increase in conductivity will be smaller for an elemental area corresponding to a bright portion of the object than for one corresponding to a dark portion thereof. In the case of a material which has a proportional response characteristic, the increase in conductivity of one elemental area when the scanning spot passes over it would be the same as the increase for any other elemental area because the scanning beam is of constant intensity. It is the non-linearity of the response characteristic of the target with respect to the total intensity of radiations applied thereto that makes it possible for the electrical response of successively scanned elemental areas to vary in an inverse manner in accordance with the light-tone values of the corresponding elemental areas of the object. As the condenser 26 will block out the direct current components of the current flowing through the circuit including the resistance 18, the current which flows through the amplifier 27 contains only the alternating or image portion so that it constitutes an image current. The transmission channels or channel and receiving station apparatus shown to the right of line B—B may be similar to that described in connection with Fig. 1.

As an alternative, a photoconducting material which has the property that radiations of one wave-length range will increase its conductivity while radiations of a second wave-length will reduce its conductivity may be used in place of mercury iodide, which has an additive but non-proportional response to radiations of different wave-length ranges. Suitable materials which have the property of responding in a "subtractive" manner to radiations of different wavelength ranges are molybdenite (a disulphide of molybdenum) and stibnite (a trisulphide of antimony). These materials increase their conductivity on exposure to red light but decrease their conductivity on being exposed to blue light. Thus, if the target S comprises an element of stibnite or molybdenite (or any other material possessing a "subtractive" response characteristic on exposure to groups of radiations of different wavelength ranges), and it has reflected thereon an image of the object in blue radiations (that is, radiations in a wave-length range from approximately 4500 to 4700 Angstrom units), the conductivity of the photoconducting material is reduced. Now, if the target is scanned with a beam of red radiations, that is, radiations in a wave-length range from approximately 6300 to 6800 Angstrom units, the conductivity of the elemental areas is successively increased by a constant amount. The conductivity of elemental areas exposed to much blue light, i. e., those corresponding to bright portions of the object, is increased so that it is, in the preferred embodiment, substantially the same as the conductivity of the material when no radiations at all are applied thereto, or in other words, the effects produced by the scanning beam in red radiations and the radiations reflected from the object in blue neutralize each other for bright portions of the image. In the case of those elemental areas which are exposed to practically no blue light, i. e., those corresponding to dark portions of the object, there is an increase in conductivity due to the red scanning beam which is substantially the same as the change which would have occurred due to the action of the scanning beam alone. Intermediate shades of the object produce corresponding changes in conductivity between these two limits. The image current produced is, therefore, inverted. The description and operation of the system, when "subtractive" response materials are used, are otherwise similar to those described above, when mercury iodide was used for the photoconducting material. It is, of course, obvious that red radiations may be used to reflect an image of the object onto the target and blue radiations used for scanning in place of the arrangement described above.

Other changes may be made without departing from the spirit or principles of the invention as hereinbefore expressed, the scope of which is defined by the appended claims.

What is claimed is:

1. In combination, a target of photoelectric material which has the property of responding in a proportional manner to radiations within a definite wave-length range and in a non-proportional manner to radiations within a second definite wave-length range, an electric circuit connected to said target, means for applying radiations within said first wave-length range from an object or field of view to said target to cause an electrical response, and means for simultaneously scanning said target element by element with a beam of radiations within said second wave-length range to cause another electrical response, the two responses cooperating to control the production of an image current in said circuit.

2. An electro-optical scanning apparatus comprising a target of photoelectric material which has a photoelectric response when radiations within a certain wave-length range are applied thereto but which has a decreased response when radiations within another wave-length range are also applied thereto, an electric circuit connected to said target, means for applying radiations received from an object or field of view to said photoelectric material to cause a response, and means for scanning said material element by element with a beam of radiations to at least partially cancel the response from each elemental area being scanned in turn, whereby an image current is produced in said circuit.

3. An electro-optical scanning device comprising a gas-tight container enclosing a photo-emissive plate and an anode, an electric circuit connected to said plate, means for applying radiations within a wave-length range from 4500 to 4700 Angstrom units reflected from an object or field of view to said photo-emissive plate to cause emission of electrons therefrom to said anode, and means for scanning said plate element by element with a beam of radiations within a wave-length range all portions of which are longer than 6400 Angstrom units to at least partially cancel the emission from each elemental area being scanned in turn, whereby an image current is produced in said circuit.

4. An electro-optical scanning device comprising a gas-tight container enclosing a photo-emissive plate and an anode, an electric circuit connected to said plate, means for applying radiations within a wave-length range all portions of which are over 6400 Angstrom units and reflected from an object or field of view to said photo-emissive plate, and means for scanning said material element by element with a beam of radiations within a wave-length range from 4500 to 4700 Angstrom units, said first-mentioned radiations causing negligible response from said photo-emissive plate but tending to cancel at least partially the response caused by said second-mentioned radiations, whereby an image current is produced in said circuit.

5. An electro-optical scanning device comprising a photoconducting cell of a material which increases its conductivity in a linear manner when radiations within a certain wave-length range are applied thereto but which increases its conductivity in a non-linear manner when in addition to the first-mentioned radiations radiations within another certain wave-length range are applied thereto, an electric circuit connected to said cell, means for applying radiations within a wave-length range from 4500 to 4700 Angstrom units reflected from an object or field of view to said cell to change its conductivity proportionally to the radiations within that range applied thereto, and means for scanning said cell element by element with a beam of radiations within a wave-length range from 6300 to 6800 Angstrom units to further change its conductivity, the total change in conductivity in said material varying non-linearly with respect to the total radiations applied thereto, whereby an image current is produced in said circuit.

6. An electro-optical scanning device comprising a photoconducting member of a material which increases its conductivity when radiations within a certain wave-length range are applied thereto but which decreases its conductivity when radiations within another wave-length range are applied thereto, means for passing an electric current through said member, means for applying radiations from an object or field of view to said member within the wave-length range which increases the conductivity of the various elemental areas of said member in accordance with the corresponding light-tone values of the corresponding elemental areas of the object, and means for scanning said member element by element with radiations within the wave-length range which decreases its conductivity to thereby decrease the total current through said member at any instant by an amount depending on the illumination of the elemental area being scanned at that instant, thereby forming an image current.

7. An electro-optical scanning device comprising a photoconducting member of a material which increases its conductivity when radiations within a wave-length range from 6300 to 6800 Angstrom units are applied thereto but which decreases its conductivity when radiations within a wave-length range from 4500 to 4700 Angstrom units are applied thereto, means for passing an electric current through said member, means for applying radiations from an object or field of view to said member within the wave-length range which increases the conductivity of the various elemental areas of said member in accordance with the corresponding light-tone values of the corresponding elemental areas of the object, and means for scanning said member element by element with radiations within the wave-length range which decreases its conductivity to thereby decrease the total current through said member at any instant by an amount depending on the illumination of the elemental area being scanned at that instant, thereby forming an image current.

8. An electro-optical scanning device comprising a photo-emissive plate and an anode, said plate comprising an alkali metal subjected to bromine or iodine vapor during manufacture, means for applying radiations from an object or field of view to said photo-emissive plate, said radiations being within a wave-length range which causes emission of electrons from said plate to said anode, and means for scanning said plate element by element with a beam of radiations within a wave-length range which tends to at least partially cancel the emission from each elemental area being scanned in turn.

9. An electro-optical scanning device comprising a photo-emissive plate and an anode, said plate comprising an alkali metal subjected to bromine or iodine vapor during manufacture, means for applying radiations within a wave-length range from 4500 to 4700 Angstrom units reflected from an object or field of view to said photo-emissive plate to cause emission of electrons therefrom to said anode, and means for scanning said plate element by element with a beam of radiations within a wave-length range longer than 6400 Angstrom units to at least partially cancel the emission from each elemental area being scanned in turn.

10. An electro-optical scanning device comprising a photo-emissive plate and an anode, said plate comprising an alkali metal subjected to brimine or iodine vapor during manufacture, means for applying radiations from an object or field of view to said photo-emissive plate, said radiations being within a wave-length range which causes negligible response from said photo-emissive plate, but which tends to cancel at least partially the response caused by radiations within a second wave-length range which causes a response from said plate, and means for scanning said material element by element with a beam of radiations within said second wave-length range.

11. An electro-optical scanning device comprising a photo-conducting target member of mercury iodide, said member possessing the property of changing its conductivity in a linear manner when radiations within a particular wave-length range are applied thereto, but which changes its conductivity in a non-linear manner when in addition to the radiations of said first wave-length range it has applied thereto radiations within a second particular wave-length range, means for applying radiations within said first wave-length range from an object or field of view to said member, and means for scanning said member element by element with a beam of radiations within said second wave-length range.

12. An electro-optical scanning device comprising a photo-conducting target member of molybdenite, means for applying radiations from an object or field of view to said element within a wave-length range which increases the conductivity of said member, and means for scanning said member element by element with radiations within a wave-length range which decreases its conductivity.

13. An electro-optical scanning device comprising a photo-conducting target member of stibnite, means for applying radiations from an object or field of view to said member within a wave-length range which increases the conductivity of said member, and means for scanning said member element by element with radiations within a wave-length range which decreases its conductivity.

14. An image transmitting system comprising a photo-electric target which is activated to produce an electrical reaction by radiations of one kind and whose reactive intensity is repressed by radiations of another kind, means for casting an optical image on said target in radiations of one of said kinds, means for casting radiations of the other of said kinds on said target, means forming the radiations of one of said kinds into a restricted beam of elemental cross-sectional area, means for scanning the image on said target element by element with said restricted beam, an electric circuit connected to said target, and means responsive to the resultant varying reaction of said target for successively developing signal currents in said circuit proportionate to the tone of points of said image as said image is scanned.

15. An image transmitting system comprising a photo-emissive target which is activated to produce an emission by radiations of one kind and whose emissive activity is repressed by radiations of another kind, means for casting an optical image on said target in radiations of one of said kinds, means for casting radiations of the other of said kinds on said target, means forming the radiations of one of said kinds into a restricted beam of elemental cross-sectional area, means for scanning the image on said target element by element with said restricted beam, an electric circuit connected to said target and means responsive to the resultant varying emission from said target for successively developing signal currents in said circuit proportionate to the tone of points of said image as said image is scanned.

FRANK GRAY.